(12) United States Patent
Kaminsky

(10) Patent No.: US 9,106,695 B2
(45) Date of Patent: Aug. 11, 2015

(54) METHOD AND SYSTEM FOR USER AUTHENTICATION USING DNSSEC

(71) Applicant: Daniel Kaminsky, San Francisco, CA (US)

(72) Inventor: Daniel Kaminsky, San Francisco, CA (US)

(\*) Notice: Subject to any disclaimer, the term of this patent is extended or adjusted under 35 U.S.C. 154(b) by 47 days.

(21) Appl. No.: 13/828,335

(22) Filed: Mar. 14, 2013

(65) Prior Publication Data

US 2014/0282887 A1 Sep. 18, 2014

(51) Int. Cl.
*H04L 29/06* (2006.01)
*H04L 29/12* (2006.01)

(52) U.S. Cl.
CPC ........ *H04L 63/1466* (2013.01); *H04L 61/1511* (2013.01); *H04L 63/126* (2013.01); *H04L 63/1458* (2013.01); *H04L 2463/144* (2013.01)

(58) Field of Classification Search
USPC .............................. 726/3–7; 713/15–156, 193; 709/225–226
See application file for complete search history.

(56) References Cited

U.S. PATENT DOCUMENTS

| | | | |
|---|---|---|---|
| 2004/0255137 A1* | 12/2004 | Ying | 713/193 |
| 2012/0096166 A1* | 4/2012 | Devarapalli et al. | 709/226 |
| 2012/0117621 A1* | 5/2012 | Kondamuru et al. | 726/3 |
| 2012/0284505 A1* | 11/2012 | Smith et al. | 713/151 |
| 2013/0173795 A1* | 7/2013 | McPherson | 709/225 |

\* cited by examiner

*Primary Examiner* — Amir Mehrmanesh
(74) *Attorney, Agent, or Firm* — Nadya Reingand; Yan Hankin

(57) ABSTRACT

This invention leverages DNSSEC to makes post-password technologies work against endpoints across the globe, rather than solely within company walls. It describes a system by which DS records are encoded in NS names, which traverse well from the customer to the registry. This invention also proposes a series of steps through which DNSSEC can be explored as a useful solution to real world problems. By creating and further developing a mirror of the real DNS, which grows by combination of true DNS record information with specially synthesized authentication keys, DNSSEC scales, providing greater security and less risk of corrupting or erroneous online material. This same technology also evaluates user activity to create a database of statistics regarding automated activity, as compared to human activity. This database assists in identification and prevention, or at least mitigation, of potential future attacks on any given client by automated bot-driven activity.

20 Claims, 4 Drawing Sheets

METHOD AND SYSTEM FOR USER AUTHENTICATION USING DNSSEC

CROSS-REFERENCE TO RELATED APPLICATIONS

This invention claims priority to, and incorporates by reference, U.S. Provisional application No. 61/610,806 filed Mar. 14, 2012.

FIELD OF THE INVENTION

The present invention relates broadly to a method and technique for retrieving and distributing secure content via the Domain Name System by leveraging Domain Name System Security Extensions (DNSSEC), and the information provided therein, in order to procure authenticated internet content across the globe.

BACKGROUND

Content is retrieved from the DNS with little more than a transaction ID and source port guaranteeing on-path visibility. Generally, only web browsers validate public keys; anything that is not a browser either trusts whatever public key they see—SSL (Secure Sockets Layer), a protocol for encrypting information over the Internet, or trusts the first key seen and remembers it for future use—SSH (Secure Shell), a cryptographic network protocol for secure data communication via a secure channel over an insecure network. In the latter case, administrators are warned that keys change, but key change events are common enough that they can be relied upon to accept the new key.

DNSSEC (which guarantees secure transmission) already exist, but the operational load of running it tends to be severe due to limitations of the offline key signing. While being able to precalculate signatures was critical for the DNS roots, online key signing is much more flexible to the real world of geolocation and load balancing and other aspects of DNS. Online key signing is also much more capable of dealing with proxied delegation, i.e. when a secure server is in front of a server that has not yet upgraded to DNSSEC, online key signing allows the secure server to sign for records behind it rather than merely declaring that some portion of the DNSSEC namespace is unsigned. Thus, existing deployment models are aligned around the need for incremental opt-in at the root and Top Level Domain (TLD) (i.e., not everything under corn can be signed) instead of the desire for incrementally correct 100% coverage (e.g., everything under bankofamerica.com should be signed, the issue becomes generating those signatures as close to the appropriate departments as is feasible).

In general, there is a small amount of DNSSEC support in any browser (e.g., Chrome supports DNSSEC signatures stapled into SSL certificates) but very little to no other client code has any serious support. This invention overcomes this limitation.

SUMMARY OF THE INVENTION

This invention leverages the DNSSEC to makes post-password technologies, like Common Access Cards (CACs), work against endpoints across the globe, rather than solely within company or agency walls.

The Domain Name System (DNS) uses Name Server (NS) records to establish referral chains for basic connectivity. The equivalents in DNSSEC are Delegation Signer (DS) records, which provide instead of the name of the next host, the hash of the next DNSKEY. Both NS and DS records must exist within the parent of a domain; however, operational experience has shown extended difficulties getting a custom channel for DS records through most registrars. This invention describes a system by which DS records are encoded in NS names, which already traverse well from the customer to the registry but are not actually used by the DNS.

This invention also proposes a series of intermediate steps through which DNSSEC can be explored as a useful solution to real world problems. The plan is implemented in a series of steps, which includes the creation of a mirror DNS system. This mirror DNS receives requests for information just like the real DNS would receive requests, but the responses made by the mirror DNS are self-authenticated and do not require the convoluted and dense pathways originally required for DNSSEC. Through use of this mirror, first developers and system administrators, then individual private and public entities, will be able to entrust and make use of such technology to better receive secure content online. Eventually, once many entities have become familiar with the mirror, they will be able to implement a DNSSEC system that is more straightforward and simple. In short, this plan makes DNSSEC scale, thus providing greater security and less risk of corrupting or erroneous material.

In addition, this invention describes an automation attack detection system, which can be a part of the mirror DNS, or it can stand on its own as a separate system outside the mirror DNS. By accumulating statistics based on user requests, this bot-detection system is able to detect, mitigate, and perhaps completely prevent criminal, fraudulent, and automated attacks on the DNS.

DETAILED DESCRIPTION OF THE PREFERRED EMBODIMENT

Figure 1:
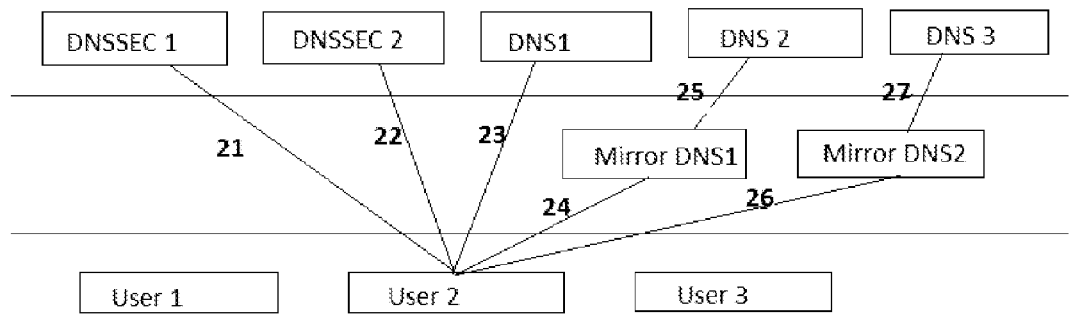
FIG. 1 depicts how the mirror DNS works between user and the real DNS in order to create secure content pathways without need to establish further DNSSEC protection. A user generally has two options after sending a request for information. These options depend on whether there is a secured DNS record or not. The first option, if available, is to go to the secure DNS server to retrieve the information (step 21, or step 22, and equivalently backwards). This requires DNSSEC protection to be in place. The second option is to go directly to the unprotected DNS and receive whatever information lies there, without any verification (step 23, and equivalently backwards). With implementation of a mirror DNS as a pass-through, all information in the DNS, whether secured or unsecure, can be authenticated such that the user will always receive verifiable content from the true DNS server (steps 24, 25, or steps 26, 27, and equivalently backwards).
Figure 2:
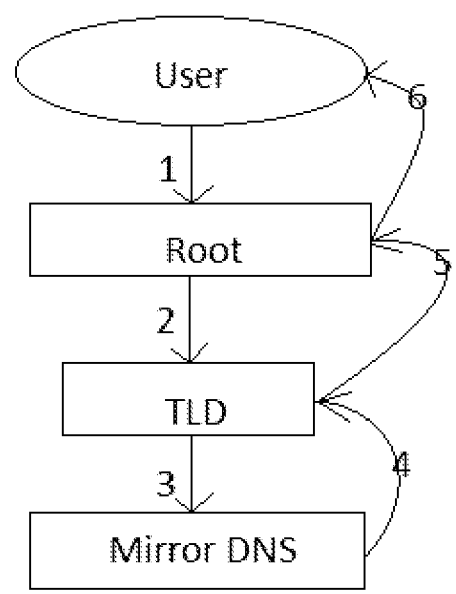
FIG. 2 depicts the effect of designation of a namespace to the mirror DNS by any given client on the benefit experienced by any given user who requests information from that client's namespace. A user enters a domain name and is directed to the root (step 1), the root sends that user to the top-level domain (TLD) servers (step 2), the TLD servers, configured to send the user to the mirror DNS, do just that (step 3). The mirror DNS retrieves the requested information from its database and relays it back to the user, back through the same intermediate steps (steps 4, 5, 6), i.e. through the TLD, to the root, and finally back to the user.
Figure 3:
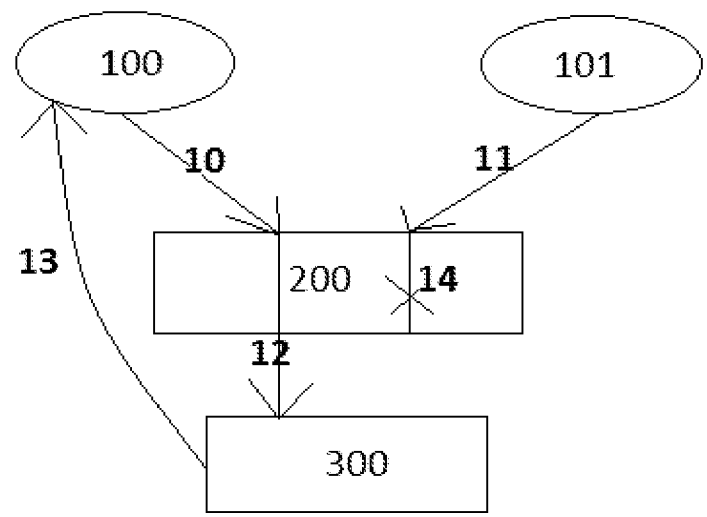
FIG. 3 depicts the automation attack detection system described by this invention. Any query, or request for information, must bypass a filter (200) created to detect and prevent bot activity. When a real (i.e. human) user (100) sends a request for information (step 10), the filter recognizes the human user and allows the request to continue through to the mirror DNS (300). On the contrary, when a robot, or automated, user (101) makes a similar request (step 11), the same filter blocks the request, by using the methods described by this invention, from continuing to the mirror DNS, thus preventing further damage from such activity. Therefore, only the true human request is processed (step 12) and answered (step 13), while the bot request is detected and discarded (step 14). In this depiction, the filter, or automation attack detection system, is completely separate from the mirror DNS system.
Figure 4:
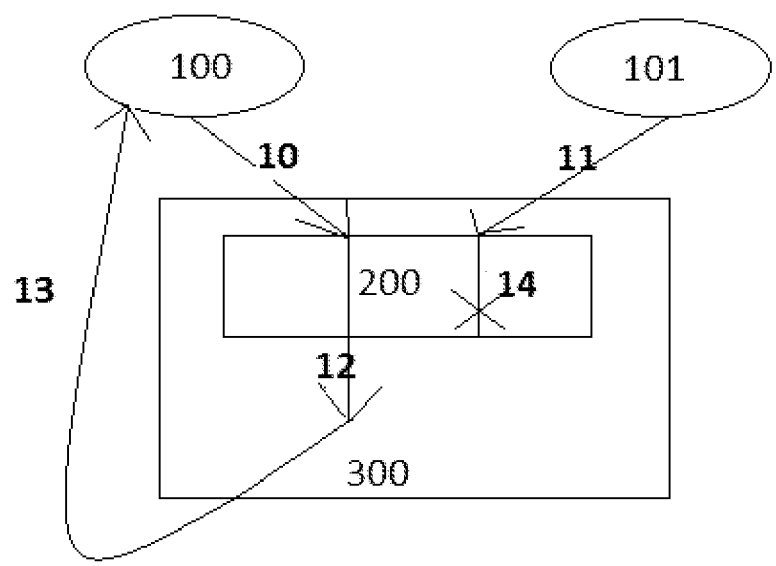
FIG. 4 depicts the same automation attack detection system as described in Paragraph 12; however, now, the filter (200) is located within the mirror DNS (300).

Throughout this Specification, the following terms have specific definitions:

(1) User: Any given underlying program, software, or process that is used to request NS and authentication information from the DNS. These are the verification systems that are employed to ensure that content received by the actual human or entity requesting or receiving the information is in fact true and reliable. This term is interchangeable, or synonymous, with "receiver".

(2) Client: An entity that purchases/subscribes to the technology claimed by this invention (i.e. an entity that assigns their Domain Name space to the mirror DNS). A client can be a developer or system administrator, as well as any public or private entity further down the DNS tree.

After over a decade of guidance from the Department of Commerce, a new technology, the Domain Name System Security Extensions (DNSSEC) has taken shape to provide companies and their employees with secure, authenticated, or encrypted interne content on an internal basis. Over two million Americans have smartcards (e.g., Common Access Cards, CACs) in the Department of Defense alone. However, something even as simple as the Army authenticating or encrypting to the Department of Defense is near to impossible despite extraordinary investment. This invention leverages the DNSSEC to makes post-password technologies, like CACs, work against endpoints across the globe, rather than solely within company or agency walls.

DNSSEC, or the DNS Security Extensions, have been specified to allow cryptographically secure retrieval of records from the DNS. To the maximum extent possible, DNSSEC has been modeled on the design of DNS itself. Delegation in DNS uses NS records to describe the name of the next host that needs to be queried, in order to resolve a name. Similarly, delegation in DNSSEC uses DS records to describe the hash of the next key that needs to be trusted, in order to cryptographically validate a response. Just as DNS cannot function without NS records in the TLD (top level domain), neither can DNSSEC function without DS records there.

The problem is that while Registries that have deployed DNSSEC within their TLDs have also deployed mechanisms for securely receiving DS records, they are multiple layers of organizational abstraction away from their customers. While some of these layers have updated their systems to support forwarding DS records as they forward NS records, many have not. This invention describes a simple mechanism whereby the name in a forwarded NS record—which is not actually used by DNS—can be used as a channel for DS record data.

Through delegation by companies (clients) of their namespace to the system described in this description, content can be authorized in a simpler, easier way than through the real DNS. The mirror DNS, described below, with its own authentication signatures where necessary, creates an online trust network. Through encrypted Domain Names given by clients to the mirror DNS server, the mirror DNS is able to obtain and authorize/verify the same information, for the same user, which was originally obtainable through the real DNS. The only difference being that there is less opportunity for confusion, corruption, and/or interception of the message.

The following is an example of the simple mechanism referenced directly above:

DS records contain a 16 bit "key tag", an 8 bit "Algorithm", and 8 bit "Digest Type", and a variable length "Digest."

The sample DS record from RFC 4034 appears as follows:
dskey.example.com. 86400 IN DS 60485 5 1
(2BB183AF5F22588179A53B0A98631FAD1A292118)

DS records are not large. The capacity of a NS Name— approximately 256 bytes—is more than enough to contain the entirety of the DS record, as so:
nsds-v1-60485-5-1-
2BB183AF5F22588179A53B0A98631FAD1A292118.
dskey.example.com Thus, instead of a domain's NS set being:

| example.com. | 102345 | IN | NS | b.iana-servers.net. |
|---|---|---|---|---|
| example.com. | 102345 | IN | NS | a.iana-servers.net. |
| ...It would become: | | | | |
| example.com. | 102345 | IN | NS | |
| nsds-v1-60485-5-1-2BB183AF5F22588179A53B0A98631FAD1A292118.\dskey.iana-servers.net | | | | |
| example.com. | 102345 | IN | NS | a.iana-servers.net. |

The encoding for this mechanism (also known as NSDS) can be described as follows:

```
nsds_domain = nsds , ".", { nsds, "." }, domain
nsds = 'nsds', separator,
    'v', version,
    separator, keytag,
        separator, algorithm,
        separator, digest_type,
        separator, digest;
version  = number;
separator = "-";
keytag   = number;
algorithm = number;
digest_type = number;
digest   = hexnumber;
number   = digit, { digit };
hexnumber = hex, { hexdigit };
digit    = "0" | "1" | "2" | "3" | "4" | "5" |
           "6" | "7" | "8" | "9" ;
hexdigit = digit |
           "A" | "B" | "C" | "D" | "E" | "F" |
           "a" | "b" | "c" | "d" | "e" | "f";
```

Throughout this document, the words "MUST", "MUST NOT", "REQUIRED", "SHALL", "SHALL NOT", "SHOULD", "SHOULD NOT", "RECOMMENDED", "MAY", and "OPTIONAL" are to be interpreted as described in RFC 2119 [RFC2119].

In DNS, each region in a name between dots is referred to as a label. Labels are limited by RFC 1035 to a maximum of 63 characters. While most DS records will fit into a single label, some may not. As such, NSDSv1 implementations MUST support concatenation of multiple NSDS labels into one "pseudolabel". Labels marked as NSDS labels MUST be parsed only in sequence; an "interrupting label" should cause any further NSDS label to be ignored. For example:
nsds-v1-60485-5-1.nsds-v1-
2BB183AF5F22588179A53B0A98631FAD1A292118.
example.com
... would contain the DS information:
60485-5-1-
2BB183AF5F22588179A53B0A98631FAD1A292118
... while:
nsds-v1-60485.foo.nsds-v1-
2BB183AF5F22588179A53B0A98631FAD1A292118.
example.com
... would only contain the keytag 60485, and thus be an invalid encoding.

NSDS implementations MUST support all previous versions of NSDS, and MUST NOT attempt to support unrecognized versions.

NSDS implementations MUST support the presence of multiple NSDS entries, representing different DS records. This is required to support key rollover.

There are, in theory, two entities that could translate the NS Name into a DS record:

Registries: Seeing a Registrar forwarding a NSDS formatted NS Name over the Registrar/Registry channel (generally, a secure EPP tunnel), the Registry could decide to interpret the NSDS formatted NS Name as a DS record and translate the detected name directly.

Registrars: Seeing a Registrant providing a NSDS formatted NS name via existing user interfaces, the Registrar could decide to interpret the NSDS formatted NS Name as a DS record, and provide this DS record via standard mechanisms in the Registrar/Registry channel.

As Registrars are the entities directly responsible for interacting with customers, and as NSDS represents an alternate, low-impact channel for customers to provide keying information, Registrars SHOULD translate NSDS formatted NS Name to DS records before submission to the Registry.

A Registry that translated NSDS formatted NS Names to DS records would enjoy full support for DNSSEC from all of their Registrars. However, they would need to maintain the translation engine effectively in perpetuity, as while a Registrar could return immediate errors to the customer via UI, the Registry by design has no such channel. Furthermore, such translation may abrogate certain legal agreements or understandings between the Registry and their Registrars. As such, Registries MAY translate NSDS formatted NS Names to DS records, if doing so is feasible.

The primary limitation of NSDS is that it only provides relief when customers are hosting their own authoritative name server infrastructure, and simply cannot push the DS records required to delegate trust to that infrastructure. A common deployment model for DNS is for Registrars to provide the authoritative infrastructure by default. NSDS is neutral for this deployment model.

Administrators who deploy DS records for their domains via NSDS MUST host both A/AAAA and NS records for the NSDS Name, or connectivity to their domain could be interrupted.

NSDS uses all the same channels as a full DS forwarding implementation—the user still logs into their Registrar, the Registrar still provides data to the Registry over a Registrar/Registry channel, the Registry still validates that the Registrar represents the interests of that domain name, and the Registry still deploys the same information into the domain. All that is different is where the DS information is entered—rather than being inserted bare, it is encapsulated inside of the unused NS Name with a trivial encoding.

This invention includes one central system, receiving queries from a host of developer machines. The central system reaches out to DNS servers for DNS records. It also reached out to various servers with encryption keys, some of which aren't signed by anyone, others of which are asserted to be legitimate by Certificate authorities. These records are also stored in a local database. When developers need to know what keys to trust for specific servers, they come to this central system, and the system, by tunneling to various points around the world to retrieve keys, provides the answer (or at least the best approximation, or best effort guess).

The series of intermediate steps through which DNSSEC can be explored as a solution to real world problems are as follows:

First, to create an "enhanced mirror" of the real DNS, with signatures added when none are available from the genuine tree. This will require particular work on the level of large scale RSA acceleration, and may include a move towards binding DNSSEC to GPU-based accelerators. In this enhanced mirror, it appears as though every entity required to perform has performed its duty. The mirror is built gradually on demand; as users request records, the mirror combines the real DNS answers to such requests with special mirror signatures.

Second, to augment our mirror of the DNS with additional records for SSL, SSH, IPSEC, and even PGP key material, using DANE and other mechanisms for including trusted keys in the DNS.

Third, to release straightforward patches for major programming and scripting languages, as well as common interactive clients, such that developers and system administrators can experience the ease of use of an Internet with widely deployed DNS based trust. When developers need to know what keys to trust for which servers, they come to the mirror DNS and the mirror gives an educated guess, by tunneling to various points around the world and attempting to retrieve keys.

Fourth, to support registry-based delegation to our servers, so that deploying DNSSEC on the proper Internet can involve no changes other than asking a registrar to interpose this company. Besides providing additional DNSSEC service, the network will be designed to defend against significant DDoS activity. As more companies delegate their namespace to the mirror server, DNS begins to scale. Real users will access the root server, the root server will send those users to the TLD (e.g. .com), and the TLD is configured to forward those users to the mirror. The TLD servers can be told both the name of a server and an IP address. The real users make use of only the IP address. The mirror, however, sees the name of the server and uses such information to access the backend server, which stores the information requested by the user. This combination of name and IP address can do even more than state the address of the backend server: it can inform the mirror (1) how to retrieve the recrods (e.g. one by one, or as a group), (2) how to retrieve records securely (e.g. via DNS protocols like TSIG, or via a special VPN link), and even (3) for whom to host special internal-only records (many companies have names that only work when inside their networks). This mirror DNS, now hosting for public and private entities rather than merely for developers, obtains all such connections and information. It should also be noted that the mirror DNS uses the same keys to prove authentic content. Thus, trusting the mirror once means not having to make another leap of faith every time an authentication is desired. While ICANN burns the trust in keys every six months, asking for re-download (via SSL and the CAs), the mirror DNS will not do so, and will re-use the same keys for authentication.

Fifth, to develop a mechanism by which our servers can securely populate both the DNS records being enhanced and the key material being proxied in. And for those circumstances that cannot be securely populated, to provide extended logs showing request/response pairs over long periods of time, so a potential attacker must contend with potential discovery of their subterfuge. As the content hosted by the mirror DNS grows, and secure configuration is employed through such mirror, users can be authenticated across organizational boundaries (e.g. for email (PGP), voice (SRTP), cell phone communications, time, etc.), rather than solely within those organizations.

Sixth, to develop an embedded solution ("DNSSEC in a box") that can live inside real world networks, providing this enhanced DNSSEC service without the external dependency.

Seventh, for either the secure proxy scenario, or the onsite "DNSSEC in a box" scenario, to support the retrieval of, and vouching for, key material not otherwise visible from the Internet. And should such key material be hosted within a Microsoft Active Directory LDAP server, to support the secure retrieval of and proxying for such material.

Eighth, to address two specific limitations of DNSSEC. They are:

DNSSEC has a dependency on absolute time, but no secure mechanism to retrieve it. This is a problem for embedded devices in particular. This invention creates a way for time to be asserted at a coarse grain (+/−30 seconds), such that NTP may then be used to acquire fine grained time.

DNSSEC requires queries that are potentially "unusual" to traverse firewalls; these queries may be blocked. This invention creates and hosts an HTTP gateway that will proxy the DNS over a more firewall friendly channel Ultimately, this invention envisions such a gateway being run as core Internet infrastructure.

Beyond these steps, this invention adds cryptographic agility to DNSSEC. Put simply, there are multiple ciphers for a server to assert its identity to a client, but no easy way for a client to inform the server of which ciphersuites it supports. This invention fixes this problem, by putting extra information in the original request.

It is also an open question whether the present model of DNS extensibility is tolerable. Effectively, binary blobs and lots of institutional friction are used to enforce that the only things that get into DNS are fully standardized records. Literally, one must patch servers to add new record types. A text layer does exist, but it is limited to 256 bytes. This invention standardizes an arbitrary length text layer, with another DNS extension in the EDNS or Additional field that will declare a string and a version for type. In DNS, magic integers are used to declare which of many records a client wants. However, magic integers are a dying style. Thus, clients that do not support specifying type with a string will get all records of a given type at a particular name.

This invention creates infrastructure that resolves real deployment issues for actual developers. By reducing the cost of setup, and providing a path for upgrade, this invention makes Internet trust scale.

This invention reduces the operational load of acquiring secure content from the DNS, including key material. Specifically, such effect is accomplished by:

Allowing DNS hosting to be upgraded to DNSSEC without decommissioning or even really identifying existing server infrastructure.

Allowing SSL, SSH, IPSec, and PGP keys to be enrolled without requiring significant operational changes.

Providing patches and libraries such that secure material can be acquired with little to no modification to existing code.

Directly addressing real world operational limitations of "architecturally pure" DNSSEC.

Regarding the cost of this approach, the smaller the operational investment of a target network, the more "leaps of faith" that are required regarding our own retrieval of insecure content. The point of this invention, however, is that we will never be worse than the leaps of faith made by existing entities, we can potentially be better, and this invention provides a means by which simple actions by a network can create more security on an incremental basis.

This invention makes it substantially easier to develop and deploy authenticated services on the Internet. Network code scales because communicating with hosts in other networks usually requires merely a DNS name declaring a target. Magic happens "behind the scenes" to acquire a routable address and initialize communication. This magic does not exist for the keying portion of secure protocols, however, and it is not by coincidence that those protocols thus do not have any serious solutions to key management.

The process of this invention creates solutions that depend on scalable key management orders of magnitude easier to implement. This will have a substantial impact on our ability to solve the Internet's ongoing crisis of authentication.

In addition to providing secure content, this invention also describes an automation detection platform NBAP (or Network Behavior Analytics and Profiling). By the creation of specific filters, companies will have the ability to accumulate statistics and prevent, or at least mitigate, potential future problems caused by programs created to forge or imitate actual human interaction with the DNS in general and/or a specific website or advertisement.

NBAP is an obstacle to bots and prevents bot-driven criminal networks from expanding and dominating valuable cyber spaces. NBAP can become as important a defense for online consumers and application owners as anti-virus tools and firewalls are to personal computer owners.

Unlike anti-virus tools and firewalls, NBAP actively damages botnets by exposing them and by enabling the prosecution of their owners and operators. This feature can shrink the number of adversaries and give legitimate operators revolutionary new offensive defenses against cyber crime.

NBAP studies and catalogs bots on a large scale. NBAP will use the evolving knowledge repository to predict the behavior of bots that are not directly observed. This feature enables NBAP users to understand and detect almost any bot before the bot can carry out fraudulent, criminal, or aggregated botnet actions.

NBAP can devalue, and disarm, and expose bots and botnets. This revolutionary cyber defense finally enables human users to catch up to bot deployers. NBAP transforms valuable cyber landscapes into safe havens for legitimate users and hazard zones for automated presences. NBAP transforms current cash-cow bots into liabilities for their owners by finally presenting the threat of detection, tracking capabilities, and prosecution for bot owners who currently expect anonymity, invisibility, and untraceable connections.

This NBAP automation detection platform will require work across the following major engineering regimes:

DOM Botprinting: Bots that script user browsers employ different hosting environments for the underlying browser engine (e.g., Webkit, Gecko, Trident) than legitimate users use (e.g., Chrome, Firefox, Internet Explorer). Unfortunately, for these bots, such "mixing and matching" alters the DOM, adding some elements, removing others, and even changing the precise behaviors of what would seem to be unmodified. Such changes also occur in the presence of "Toolbars" or Browser Helper Objects (BHO's). This invention categorizes these changes across a wide variety of browsers and known hosting environments, including when the host is inside a remote connection (RDP/VNC) or even a VM. It also contains new and more powerful "memory-scraping" mechanisms for finding undocumented DOM elements that are not exposed by JavaScript object iteration.

Humanprinting: Humans interact with real content differently than bots do, and even differently than humans on lower latency connections (particularly when operating over remote desktop solutions). This invention can identify those differences.

Scale: Many systems work well under limited deployment properties but fail immediately when scaled up. This invention creates a metric collection system that can operate across many threat environments and a non-insubstantial portion of all Internet traffic. This cannot be "punted" as a mere implementation detail; the addition of the scale constraint alters the fundamentals of how the data is collected and transmitted in the first place. This invention contains mechanisms for analyzing those metrics at scale, creating the capacity to provide a near-real time feed linking bot behavior with application session data.

Deployment Engineering: Some targets this invention would seek to protect can directly embed the required JavaScript. Others will require injection at proxy or reverse proxy. Safe mechanisms are implemented for this injection.

Hardening against Reverse Engineering: Systems that are quickly reversible may quickly find themselves irrelevant to attackers. This invention forces "online" analysis of a mutating metric collector, whose absolute targets for analysis are not fully exposed to the attacker. Specifically, this invention uses virtual machine compilation (Emscripten) and Bloom Filters to reduce the amount of data exposed during offline analysis.

Furthermore, this invention uses actively mutating rendered content (for example, firing 'page ready' events while still presenting a white screen to the user, thus validating the user actually has a pair of eyes) and limited amounts of server side code (to send notifications that a client is supposed to be executing JavaScript—something that may or may not actually occur). Target languages may include C#, Java, JavaScript, PHP, Python, and Ruby.

Even further, this invention will detect effects of Virtual Machines on browsers through notable timing differentials in the VM environment, both in terms of execution time and "wall clock vs. timeslice jitter." This can be detected from a pure JavaScript environment.

Additionally, this invention implements a DSL (Domain Specific Language) for the metric collection model, which exposes a constrained execution environment not able to execute arbitrary code but able to retrieve a controllable subset of the surrounding DOM.

Finally, the process includes implementation of mechanisms for noting cross-layer disagreement between TCP and HTTP. For example, an HTTP connection could arrive from what appears to be a Linux TCP stack, or what should be a mere home connection could have an excessively high bandwidth datacenter class link. The process identifies both passive and active mechanisms for efficiently noting such risk signs at appropriate scale for different risk environments.

The components of NBAP are as follows:

NBAP Server Code: NBAP operates from a server or distributed servers to receive and analyze test and live browsing data. The NBAP server code performs the following actions: (a) Receive test browsing data and analyze it for humanity/bot ID opportunities, (b) Probe live suspected bots to identify, catalog, and analyze bots, (c) Collect data for storage and use in the Knowledge Repository, (d) Assemble lists of newly discovered bots, their point of origin, and their browsing habits, and (e) Serve a comprehensive mix of data types to obtain complete browsing data.

NBAP Client Code: NBAP clients act as probes to test NBAP humanity/bot algorithms and to generate data including test data. Test bots are programmed to resemble humanity as closely as possible to determine whether and how the NBAP automation detection system can be fooled. These tests will guide the calibration and fine-tuning of NBAP components and will provide metrics for determining which bot characteristics are detectable using a given NBAP configuration.

NBAP Knowledge Repository: The NBAP Knowledge Repository consists of easily updatable files that drive bot detection activities and catalog the activities and characteristics of live discovered bots. Additionally, findings are collected regarding detected bots and discovered bot browsing data for further study. The Knowledge Repository will include the following: (a) BDA (Bot Detection Algorithms), which has KRUM update capabilities. It also drives NBAP bot detection and uses the PDBC file, (b) PDBC (Predicted Bot Browsing Characteristics): Has KRUM update capabilities; provides benchmark data to compare real browsing activity with aggregated bot and humanity data. (c) Real "Discovered Bot" Browsing Data (Continuously updated with new data): Can be shared with application developers to further bot detection research, (d) Detected Bot Catalog including point of origin, purpose of bot, and other measurable attributes (Continuously updated with new data): Can be shared with application owners to propagate current bot blacklists that are in line with NBAP activities and discoveries.

KRUM (Knowledge Repository Update Mechanism): The NBAP team regularly updates the bot detection and defensive techniques. Regular updates will increase the difficulty and expense of defeating our evolving bot detection mechanisms. KRUM quickly and easily incorporates new humanity/bot browsing characteristics as they are discovered during and following this effort. KRUM will enable maintainers to update BDA and PDBC elements quickly and easily. These updates will maintain state of the art bot/humanity detection algorithms as new developments are made.

Utility Software Bundle: NBAP incorporates a Utility Software Bundle to handle humanity/bot identification algorithms, including known distinction algorithms and algorithms that are produced from the effort's research. The Utility Software Bundle is built in a modular style that enables easy alterations and updates to algorithms as more sophisticated Turing tests or updates to current algorithms are developed.

AOS (Automated Offensive Suite): During the effort, a suite of small, flexible automated attacks are deployed to test the NBAP server and client code as well as NBAP's ability to detect automation.

NBAP will succeed because it uses automation against automated Web presences. This system aggressively probes, analyzes, and catalogs bot behavior and evolves to detect more sophisticated bots as they are deployed. Unlike reactive bot-prevention widgets designed to keep bots out of online applications, NBAP covertly discovers bots of all types and uses discovered bot behavior to automate the discovery of more bots.

The covert, automated NBAP approach scales at least as quickly and as widely as the bot networks themselves and can therefore become a comprehensive, effective defense against botnets and bots.

Furthermore, many security technologies embed identity into "what we have", i.e. a specific laptop, possibly with a TPM storing a difficult to move key, possibly with that trusted device not even electronically linked to the host. In these circumstances of "puppetry", NBAP still detects bad actors even without a comprehensive fingerprint of the legitimate user.

With regard to incentivizing the adversary: (a) NBAP's client code can be reverse-engineered. The adversary may be able to use this capability to send false information to the NBAP system. However, NBAP's server code and knowledge base remain opaque. Reverse engineering the NBAP server code, algorithms, and knowledge base enough to significantly compromise the system is all but impossible. (b) NBAP may also expose non-adversarial covert bots. (c) An adversary with access to NBAP data could potentially use the system to determine if a bot has been detected or if it remains covert. (d) Adversaries may use systems like NBAP to develop undetectable bots through trial and error by pitting new bots against NBAP until NBAP fails to detect the bot. This may enable an adversary to get ahead in the short term, but NBAP should always be able to catch up using its evolving and improving bot detection techniques.

The following are benefits of use and implementation of NBAP:

NBAP Detects "Replay Attacks" Only Under Certain Conditions:

Bots that must be fast or perform a sequence of actions for the first time can always be detected by NBAP. However, an attacker might defeat NBAP defenses by "recording" human actors and replicating their clicks and application activities at the same speeds, and matching other human characteristics by mimicking pre-recorded human actions. NBAP can detect "replay attacks" under the following conditions: (a) Replay attack is implemented more than once, (b) Attack does not employ random variation in human-response click times, (c) Replay attacks deployed by single attacker or attacker network work toward a shared goal.

If an attack does not meet the above conditions, it is possible that NBAP will not succeed in detecting it. However, since executing attacks under these conditions requires slow automated actions, NBAP will be successful in detecting much of the harmful automation on the Web today and in slowing down or limiting undetected automation to more manageable speeds and scenarios. While not a perfect outcome, a replay attack does remove the speed advantage of a bot and requires an individual bot to greatly reduce the number of clicks it can perform while spoofing human clicks.

NBAP will defend against the possibility of replay attacks as follows: (1) Identify any identical activity profiles as automated, not "natural", even if they seem to be originating from a human in every other way, (2) Program NBAP to look for patterns within sets of sessions that deviate in timing by predictable amounts or that follow the same set of steps, (3) For "large sample size" clients, introduce variability that creates subtle differences in human behavior but is ignored by machines.

NBAP Enables Direct Detection of Online Fraud:

Taking the money out of advertising fraud defunds an entire cyber arms market that supports them. The money made by a small number of scams feeds the criminal market for rootkits, botnet operations, and other technologies in the global criminal arms market. NBAP technology will mean that advertising fraud can be directly detected, not statistically surmised.

For example, NBAP detects bots that click on ads on a specific site. NBAP reveals the origin of the bot clicks. A "follow the money" security investigation connects bot-driven fraudulent advertising revenues to the organization that receives the funds. Application owners and law enforcement agencies are able to (a) block ongoing operation of the fraudulent organization, (b) freeze and recover funds belonging to defrauded consumers and organizations, and (c) prevent the criminal organization from creating future automated fraud incidents.

NBAP Enables "Follow the Money" Attribution of Cyber Criminal Acts:

NBAP can achieve one of the most elusive goals of all botnet fights. NBAP technology is covert. Nothing about how NBAP operates says, "We're detecting bots." By looking at the referrers of fraud, we can see the affiliate sites getting paid for fraudulent clicks or impressions without tipping them off to having been caught. This can give law enforcement an opportunity to "follow the money," which means that we have an actual shot at attribution.

For example, NBAP information leads to the prosecution of attackers and results in their imprisonment, confiscation of equipment necessary to make additional attacks, and connection blocking. This means that these criminals can no longer operate and update their bots and botnets, giving legitimate operators time to catch up and update their applications to prevent future bot attacks.

NBAP De-Funds Online Fraud:

Deployed at scale, detection technology like NBAP can work as a huge economic disincentive to online fraudsters as the cost to defeat detection rises past the profit opportunity. Eliminating this source of money for cyber criminal organizations could have a far-reaching effect on the overall criminal market.

For example, exposure as a criminal bot operator makes it harder for bot operators to profit from or propagate their bot activities, and it deters bot attacks from other programmers.

NBAP Exposes Unauthorized Automated Presences:

NBAP can specifically defend institutional Web sites and applications against automated presences including bots and botnets. This defense will result in fewer security compromises through those sites as well as improved understanding of what type of automated attacks are happening against the application.

For example, NBAP detects bots that appear to be attempting to collect information from distributed government sites to gain access or information. NBAP reveals the bot attacks, their origin, and extensive information about their automated behavior that yields insight into the motivation behind the automated attacks and equips the institution to better respond to the attacks.

Technical Coverage of NBAP Actions and Implications is as follows:

NBAP gathers and processes elements of a given user's interaction with a web page that occurs after a web page has been loaded by the user and compares those elements to reference results drawn from a control group. NBAP places certain elements within the code of a web page prior to it being loaded by a given user for evaluation after that user has loaded that web page.

Before the process of differentiation begins, NBAP inserts an individualized code snippet into the HTML code of a given web page. When this code snippet is present in the code of a given web page and that page is accessed, performance metrics are sent to remote analysis servers via asynchronous HTTP posts. These metrics evaluate the behavior and performance of the entity that viewed or is viewing the given web page, and how that page was loaded.

NBAP evaluates performance metrics for various visitors to a given web page containing the code snippet, as well as those for all web pages containing similar code snippets are compiled and aggregated by the remote analysis servers into reportable metrics, which in turn are made available to the operator of a given web page in a number of reporting mediums, including, but not limited to, password protected interactive HTML dashboards, exportable spreadsheet documents, and subscription based email and PDF reports and can be used in real time to control access to a given web page.

NBAP evaluates performance metrics including the origin and destination of a visitor, the likelihood that the visitor was an automated agent or human, and a variety of variables that identify information, such as advertising data points.

NBAP uses probabilistic, statistic, and direct analysis of the following elements in differentiating humans from automated and remote control presences:

Location Evaluation: Evaluate the location of clicks on a given web page executed during a given visit to a web page.

Interclick Timing Evaluation: Evaluate the timing between clicks on a given web page during a given visit. Use interclick timing to identify or determine information about a given user or class of users. This timing can provide a "fingerprint" of a given user's desktop and/or patterns of Internet browsing to reveal "humanness", automation, or data supporting aggregated bot ID.

VPN and Remote Desktop Interclick Timing Evaluation: Perform Interclick Timing Evaluation even if a given browsing session actually traverses a virtual private network and/or remote desktop connection by relying upon the fact that mouse, keyboard and click commands must be transmitted over such connections at a fixed read rate.

Motion and State Related Mobile Automated Agent Detection: HTML5 allows gyroscope and accelerometer readings to be taken "zero click," or without any active engagement with a web page by a user, and scroll information can be similarly read. The presence of this type of information, related to the position of the mobile device in space, and the engagement of the user with the interface of the mobile device, is deterministic of "humanness". Changes such as this can reflect the precise environment the device claims to be in. This type of information can contribute to a statistical model designed to evaluate if a given visit was made by an automated agent.

IP and Geolocation Related Mobile Automated Agent Detection: NBAP uses IP addresses, geolocation and other more static data related to a given device and its user to identify bots.

Time Based IP and Geolocation Related Mobile Automated Agent Detection: All available data is evaluated over short, medium, and long time frames and compared.

Data Hiding and Separation: When possible, NBAP's server code will cause a web page to trigger evaluative processing on the computer or other device that is browsing. NBAP will transmit results to a remote machine for evaluation. NBAP can use this action to create uncertainty as to which specific aspects of the browsing data are actually being evaluated, and for what purpose. Malicious actors involved in creating and using automated browsing agents may be less likely to, and require more resources to, determine that human/bot evaluation is taking place.

Rendering Differential Evaluation: NBAP will evaluate how long various actions take to execute. When a human is in the loop, a web browser necessarily engages certain aspects of a computing device's hardware, including graphics and sound hardware. NBAP evaluates the amount of time taken to complete certain actions, taking into account the required hardware engagement. NBAP will also factor in whether or not the browser must "reflow" the page, resulting in a predictable sequence of redraw events. NBAP will use these factors to differentiate between an unaccelerated screen (a "virtual frame buffer") and real screens.

Jitter Evaluation. NBAP will evaluate "jitter" (as opposed to absolute time) as an indication of if a given system is doing a given task in the foreground or the background.

VM Timeslicing Analysis. NBAP will determine if Virtual Machine Timeslicing is occurring based on evaluation of rendering delays (i.e. by way of quantization of time potentials, as may be seen through repeated calls to millisecond timers in JavaScript).

Cache Validation—NBAP will use the behavior of web browser cookies and caches, particularly over time, to differentiate between human and automated browsers, especially if one browser is being driven across many destinations.

The following are selected NBAP analysis results with security implications:

Botprinting: Different automated agents expose themselves in different ways. NBAP will enable the exposure, identification, and comparison of different automated agents and their "signatures". These "Botprints" may be used to evaluate trends in the use of automated agents and to track their development and spread.

Evaluation of Browser Errors: NBAP will be able to show whether a given browsing session is being carried out by an automated agent. For example, it is possible to mine excess metrics, and even to intentionally cause JavaScript errors, so that the error responses generated may be used to distinguish between automated agents and human browsers.

A-B Evaluation: Automated agents are not driven by the same factors as human beings and will not respond to different triggers in the same manner as human beings will. When NBAP is deployed across different scenarios, the comparison of differing responses by different sources of browsing traffic may be used as an active mechanism to detect or supplement the detection of automated behavior. This comparison remains effective even when humans are used in place of automated agents for the purposes of carrying out advertising fraud or criminal activities.

Stochastic Signature Evaluation: NBAP's automated agent detection methodologies can successfully predict behavior based on sampled behavior and do not require direct examination of every web page, or every load of a given page. Mutation of NBAP's deployed JavaScript, in both location and style, significantly raises the cost of operators of automated agents' success and limits their ability to develop and deploy effective countermeasures to NBAP's methods.

Evaluation in terms of Cost Per Human: Rather than evaluation of web traffic in terms of metrics such as cost per click, cost per thousand clicks, and cost per action, NBAP evaluates traffic in terms of a more meaningful metric: cost per human ("CPH"). Rather than measuring clicks or other events that may or may not be generated by an automated agent, evaluation of CPH allows a much more meaningful determination of the effectiveness of amounts spent to attract traffic to a given web page.

Heatmap Signature Evaluation: When a human being is present in a browsing session, NBAP can evaluate mouse and keyboard patterns usage patterns so that for each user a pattern signature may be determined, assuming that the settings of that person's browser allow for data collection.

Heatmap Signature Correlation: With a sufficient number of such heatmap signatures collected, NBAP can deliver usage models across large numbers of websites and detect non-human variation models, with more data than an operator of automated agents may possess.

Global Visibility: With the widespread deployment of NBAP methodologies, not merely into destination sites, but also into the JavaScript that hosts the clicks itself, NBAP will be able to measure rates of automated agent action not merely on sites that have actively deployed the necessary code snippet, but for effectively all sites that are able to deploy such a code snippet. Done properly, this methodology can provide a statistically significant sampling of all automated and remote control fraud on the Internet, and thus provide global visibility with regard to automated browser action, and not just visibility into sites running NBAP code.

Source Page Embedding: By embedding NBAP code in the page from which a given click originates, or the "source page," interaction is guaranteed regardless of the nature of the visitor, since by definition a click requires interaction. Source page embedding external to an iframe further allows monitoring of other advertising campaigns or content placed on a given source page, without requiring the involvement of the parties placing such content.

Embed Locations: NBAP code can be placed in the destination page, inside an iframe on the page from which a click to be evaluated originated, or outside an iframe on the page from which a click to be evaluated originated, not only taking advantage of the inherent benefits of each type of placement, but also allowing monitoring of the "total click lifecycle."

Real Time Filtering: NBAP can enable real time filtering to effectively prevent automated agents from reaching their destinations.

Browser Validation—A web browser's user agent (i.e. the type of web browser currently being used) may be misrepresented, or "spoofed," both by its HTTP source and/or by the content of the JavaScript DOM. NBAP can detect such spoofing by using browser version specific metrics.

Load validation: For efficiency, some content may not be loaded by automated agents. NBAP can detect such missing loads.

Proxy Detection: It is possible to alter the behavior of the evaluating server, based on whether a proxy is in place. The manner in which all other metrics are evaluated may be altered based on the behavior of these intermediary nodes.

It will be understood by those skilled in the art that various changes in form and details may be made therein without departing from the spirit and scope of the invention as set forth in the appended claims. Those skilled in the art will recognize, or be able to ascertain using no more than routine experimentation, many equivalents to the specific embodiments of the invention described herein. Such equivalents are intended to be encompassed in the scope of the claims.

What is claimed is:

1. A system for transmitting secure data with retrieval data from Domain Name System Security Extensions (DNSSEC), comprising:
   at least one Domain Name server communicatively coupled to a processor,
   a computer-readable memory accessible to the processor and comprising one or more sequences of instructions which, when executed by the processor, cause the processor to carry out the steps of:
   encoding a Delegation Signer (DS) Record within a Name Server (NS) Record, and using a NS channel to transmit NS and DS record data;
   wherein the system further comprises a mirror of a genuine Domain Name server created through a delegation of a Domain name space to the mirror, the mirror being communicatively coupled to the processor for performing the encoding of DS records within NS records;
   wherein said mirror is continuously built as information is requested by users, and wherein mirror records are synthesized by combining answers from a genuine Domain Name server with new signatures for authentication created when a signature is not available from the genuine Domain Name server.

2. The system of claim 1, further comprising instructions which, when executed by the processor, cause the processor to carry out the additional step of:
   sending a NS Record, which includes a DS Record, from the Domain Name server to a user,
   said user receiving the NS record and extracting the DS record to authenticate a sending Domain Name server.

3. The system claim 2, wherein the user is able to process an unencoded NS Record without a DS record part.

4. The system of claim 2, wherein the user, in order to guarantee an authentication, communicates through a chain of name servers to a Root Name Server and then equivalently back down.

5. The system of claim 1, wherein the system is scalable through initial implementation by a small group of clients and subsequent growth of implementation towards global usage.

6. The system of claim 1, wherein DS Record incorporation into a NS Record is aided by a registrar.

7. The system of claim 1, further comprising an automation detection platform, which works in cooperation with a domain name server;
   the platform comprising at least one filter, the filter accumulates statistics of name server requests.

8. The system of claim 7, further comprising a hot-mitigating unit that uses collected statistics to mitigate attacks by hot-driven criminal networks.

9. The system of claim 7, wherein the platform is implemented as a part of the Domain Name Server.

10. The system of claim 7, wherein said automation detection platform compiles results with security implications in order to build a capability to identify automation.

11. The system of claim 7, wherein said automation detection platform uses location evaluation to differentiate human from automated/remote control activity.

12. The system of claim 7, wherein said automation detection platform uses interclick timing evaluation to differentiate human from automated/remote control activity.

13. The system of claim 7, wherein said automation detection platform uses motion and state related automation detection to differentiate human from automated/remote control activity.

14. The system of claim 7, wherein said automation detection platform uses IF and geolocation related automation detection to differentiate human from automated/remote control activity.

15. The system of claim 7, wherein said automation detection platform uses tie based automation detection to differentiate human from automated/remote control activity.

16. The system of claim 7, wherein said automation detection platform uses data hiding and separation to differentiate human from automated/remote control activity.

17. The system of claim 7, wherein said automation detection platform uses rendering differential evaluation to differentiate human from automated/remote control activity.

18. The system of claim 7, whereto said automation detection platform uses jitter evaluation to differentiate human from automated/remote control activity.

19. The system of claim 7, wherein said automation detection platform uses VM timeslicing analysis to differentiate human from automated/remote control activity.

20. The system of claim 7, wherein said automation detection platform uses cache validation to differentiate human from automated/remote control activity.

* * * * *